A. W. STEWART.
Folding-Chairs.
No. 6,076.
Reissued Oct. 6, 1874.
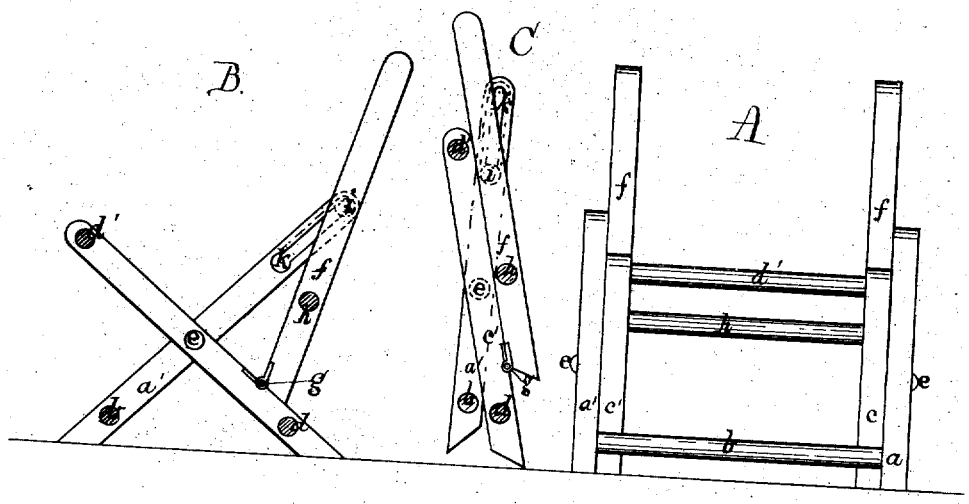
Witnesses:
J. E. Maynadier
Chas. F. Sleeper.
Inventor:
Alex. W. Stewart
THE GRAPHIC CO. PHOTO-LITH. 39 & 41 PARK PLACE, N.Y.

UNITED STATES PATENT OFFICE.

ALEXANDER W. STEWART, OF BOSTON, MASSACHUSETTS.

IMPROVEMENT IN FOLDING CHAIRS.

Specification forming part of Letters Patent No. 102,179, dated April 19, 1870; reissue No. 6,076, dated October 6, 1874; application filed August 19, 1874.

*To all whom it may concern:*

Be it known that I, ALEXANDER W. STEWART, of Boston, in the county of Suffolk and State of Massachusetts, have invented Improvements in Folding Chairs; and I do hereby declare that the following, taken in connection with the drawings, which accompany and form part of this specification, is a description of my invention sufficient to enable those skilled in the art to practice it.

My invention relates particularly to the construction of folding chairs of that class in which a folding back and two pairs of crossing and folding legs are employed.

My invention consists, first, in a new combination of the two frames, formed by the two pairs of crossing legs and their connecting stretchers, and the back-frame formed by the two back-posts and their connecting stretchers; and, secondly, in a new combination of the stretcher, which supports the seat with these frames.

This chair is designed principally for what is known as a camp chair or stool, extensively used on steamboats, and in parks, and similar public places, the seat and back being formed of flexible webbing, though my construction is also applicable to chairs having rigid folding seats.

The drawing represents the frame-work of a chair embodying my improvement, the addition of the webbing being alone necessary to complete the chair.

A shows the chair-frame, in front elevation. B is a vertical section of the open chair; C, a similar section of the folded chair. *a a'* denote two of the legs, constituting, with the stretcher *b*, one frame, which crosses and is pivoted to the other frame, composed of the legs *c c'* and stretchers *d d'*, the two frames being pivoted together by pins *e*, and, so far as they alone are concerned, closing together the same as in many other folding chairs. Each leg *c c'* has pivoted or hinged to it a post or upright, *f*, (preferably hinged, as seen at *g*,) the two posts *f* being connected by a stretcher, *h*, and thus constituting a rigid frame. The frame inclines rearward from the legs, as seen at B, and from the outer side of each post a pin, *i*, projects, this pin extending into a groove, K, in the inner face of the adjacent leg *a* or *a'*.

When the chair is open, the two pins are at the tops of their respective grooves, and any tendency of the legs to spread farther is arrested by the pins abutting at the tops of the grooves.

This arrangement of the back-frames with the two leg-frames is the distinguishing peculiarity of the first part of my invention.

I am aware of the chair patented in Letters Patent No. 88,513, by A. M. Rogers, March 30, 1867, in which the frames are combined together; but in that chair the leg-frames differ widely from mine, in that the legs forming one of the frames are necessarily slotted; and, consequently, the back-frame can never act to prevent the farther spread of the legs after the chair is open. I disclaim, therefore, any combination of these three frames, in which the legs constituting one of the frames are slotted as shown in that patent.

When the legs are folded, the legs *a a'* in their inward movement push in the posts *f*, which, turning on their hinges or pivots, fold closely up against the legs *b b'*, as seen at C, the pins *i* sliding freely in the grooves *k*.

This arrangement of parts forms an exceedingly compact chair for packing, while the disposition of the back-frame for an open chair is such as to render it very rigid and enduring, the hinging of the posts at the bottom to the legs *b b'*, and the connection of the legs *a a'* and posts *f*, near the tops of the legs *a a'*, bracing the frame very strongly for supporting the back of the sitter.

It will be obvious that the pins may be on the legs, and the grooves in the posts, and that the pins and grooves may be otherwise somewhat differently arranged, though the arrangement shown is a very effective one.

The stretchers *d* and *h* support the seat, which may be either of webbing attached to the stretchers in the usual way, or may be a rigid seat attached in the usual way to the stretcher *d*, and resting upon the stretcher *h*, so as to drop behind the stretcher *h* when the chair is folded.

The distinguishing feature of the second part of my invention consists in attaching the back stretcher of the seat to that part of the back which extends from the top of the front leg down to the back leg.

What I claim as my invention is—

1. The combination, with the leg-frames of a folding chair, in which the front-leg frame is independent of the seat, of a back-frame, connected at its lower end to the rear legs, and to the upper end of the front-leg frame by means of a pivot, whereby the legs are prevented from spreading when the chair is opened, and admit of being folded compactly together when closed, as and for the purposes specified.

2. The combination, with the back-frame of a folding chair, provided with an independent back-section, of a stretcher attached thereto for supporting the rear of seat, whereby the strain of such seat is received directly upon the back, substantially as described.

ALEXR. W. STEWART.

Witnesses:
J. E. MAYNADIER,
M. A. KNOX.